(No Model.)

C. C. CAMPBELL.
ELASTIC TIRE FOR VEHICLE WHEELS.

No. 533,704. Patented Feb. 5, 1895.

Witnesses
Wm H Chapin
N. J. Clemons

Inventor
Christopher C. Campbell
By Chapin
Atty's

UNITED STATES PATENT OFFICE.

CHRISTOPHER C. CAMPBELL, OF SPRINGFIELD, MASSACHUSETTS.

ELASTIC TIRE FOR VEHICLE-WHEELS.

SPECIFICATION forming part of Letters Patent No. 533,704, dated February 5, 1895.

Application filed October 22, 1894. Serial No. 526,564. (No model.)

*To all whom it may concern:*

Be it known that I, CHRISTOPHER C. CAMPBELL, a citizen of the United States of America, residing at Springfield, in the county of Hampden and State of Massachusetts, have invented new and useful Improvements in Elastic Tires for Vehicle-Wheels, of which the following is a specification.

The object of this invention is to devise an elastic tire for vehicle wheels which shall be very resilient, and which, above all, shall be very durable and capable of withstanding hard usage, and in no wise be subject to any detriment by reason of punctures in the outer tire cover.

The invention relates to a construction of tire in which there is comprised coiled wire, or wires, ultimately arranged in the form of a hoop, supported by the rim and in turn supporting the "jacket" or "shoe," as the outer tire cover is variously termed.

The invention therefore consists in a tire composed of wires and parts having peculiar conformations, and in combination, all substantially as will hereinafter fully appear and be set forth in the claims.

Figure 1:
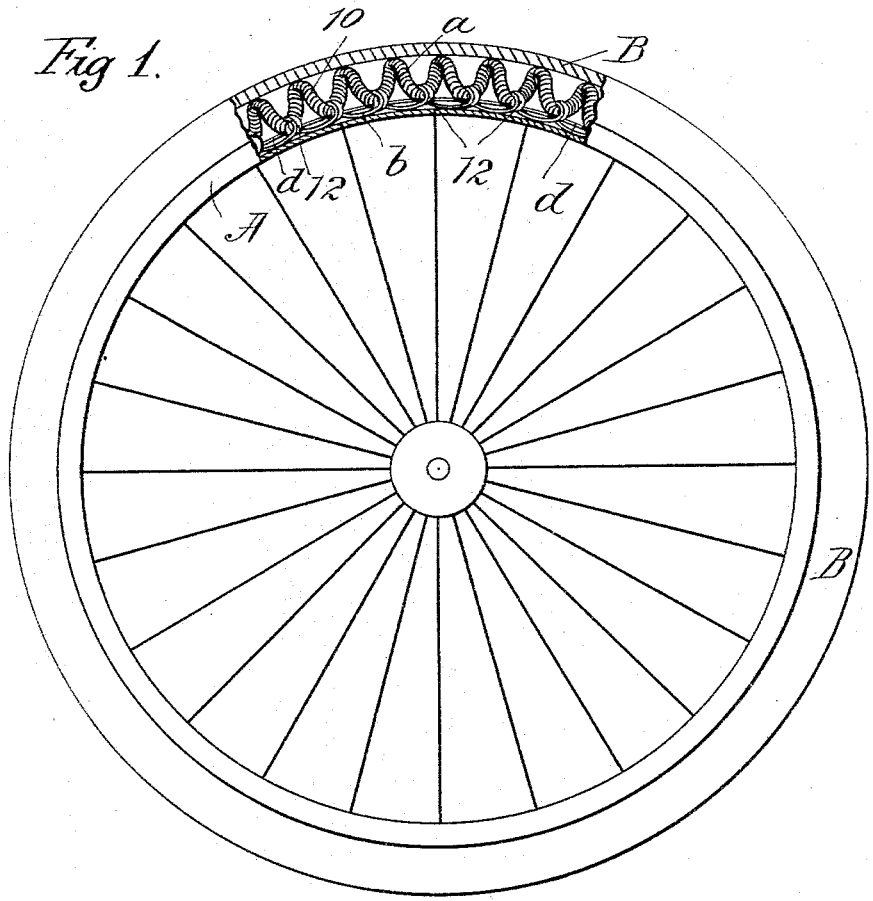
Figure 2:
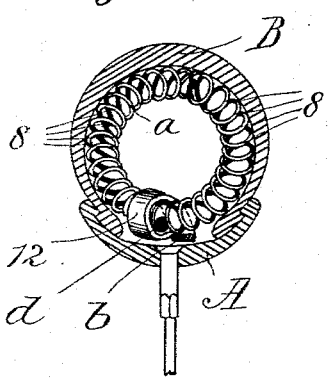
Figure 3:
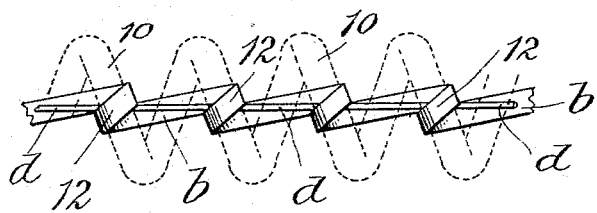

In the accompanying drawings in which the improved construction of tire is illustrated, Figure 1 is a side elevation of a vehicle wheel with a portion broken out in section to more clearly indicate the internal construction. Fig. 2 is a cross section of the rim and tire on a larger scale. Fig. 3 is a plan view on a still larger scale, of a portion of the tire to be hereinafter referred to.

Similar characters of reference indicate corresponding parts in all of the views.

In the drawings, A represents the rim of the wheel which may be of any of the well known or approved constructions, and composed of metal or wood, as preferred.

B represents the outer jacket or shoe which may be of the clincher form, as indicated in Fig. 2, or it may be in the form of the well known hose-pipe. The means which supports the jacket in its distended relation, consists essentially in the spirally coiled wire, that is, a very long spiral spring, $a$, having the multiplicity of small coils, 8, which long spiral spring, as a whole, is formed into greater and more open convolutions, as seen at 10; and the whole is arranged to encircle the rim, the open convolutions, 10, being of such diameter as to properly fill out, or distend the outer tire cover. This spirally wound wire which is again formed into the series of greater convolutions, as shown and above referred to, has combined therewith, for the purpose of restraining it from undue distortion, or the creeping of the convolutions, the strip, $b$, comprising the series of loops, 12, and the strip, or wire, $d$. The said strip, $b$, forms the base of the tire,—that is, the portion opposite its tread,—and the bases of the convolutions, 10, 10, pass through the loops, 12, 12, the axes of which loops are so oblique to the length of the strip as to conform to the direction of progression of the base portions of said convolutions, see Fig. 3; and the strip of uncoiled wire, $d$, has an inter-engagement with both the loops of the strip, $b$, and the minor coils, 8, of the convolutions, 10, which are found within the loops. The loops, in their engagement with the convolutions prevent the convolutions from having any movements of displacement, the one bodily toward or from the next, whereby their uniformity of spacing may be altered, and the length of wire, $d$, in its engagements with both the loops, 12, and the convolutions, 10, prevent the convolutions from creeping in the directions of the axes of the minor coils, 8.

The parts, $a$, $b$, and $d$, formed and inter-engaged as described, and brought to the form of a hoop to surround the rim, have their ends properly united, either permanently or detachably, to accord with the particular characters of rims and outer covers with which the so constituted elastic support is to be combined.

Having thus described my invention, what I claim, and desire to secure by Letters Patent, is—

1. In an elastic tire for vehicle wheels, a wire coiled to form a long spiral spring which is again wound into a series of greater convolutions, the whole being brought to a circular form, and a metallic strip which in its entirety is in the form of a hoop, and which comprises a succession of suitably spaced loops with which the bases of the said convolutions are engaged, substantially as and for the purpose set forth.

2. In an elastic tire for vehicle wheels, a wire coiled to form a long spiral spring which is again wound into a series of greater convolutions, the whole being brought to circular form, and a metallic strip which in its entirety is in the form of a hoop and which comprises a succession of suitably spaced loops, through which the base portions of the said convolutions are respectively passed, and means for connecting the bases of the convolutions to and within said loops,—all whereby the convolutions are prevented from having approaching movements, and whereby each convolution can have no creeping action in the direction of its helical course of progression, substantially as described.

3. In an elastic tire for vehicle wheels, a wire coiled to form a long spiral spring which is again wound into a series of greater convolutions, the whole being brought to circular form, a metallic strip, $b$, having a series of loops, 12, with which the bases of the said convolutions are engaged, and the wire or rod having an inter-engagement with the coils comprised in the base portions of the convolutions, and with said loops, substantially as described.

CHRISTOPHER C. CAMPBELL.

Witnesses:
WM. S. BELLOWS,
K. I. CLEMONS.